United States Patent [19]

Makepeace

[11] Patent Number: 4,654,380

[45] Date of Patent: Mar. 31, 1987

[54] MARINE ANTI-FOULING PAINT

[75] Inventor: Andrew P. Makepeace, Newcastle-upon-Tyne, England

[73] Assignee: International Paint public limited company, United Kingdom

[21] Appl. No.: 741,607

[22] Filed: Jun. 5, 1985

[30] Foreign Application Priority Data

Jun. 8, 1984 [GB] United Kingdom ............... 8414675

[51] Int. Cl.$^4$ ........................... C09D 5/14; C09D 5/16
[52] U.S. Cl. ...................... 523/122; 106/16; 106/18.32; 106/18.33; 106/18.34; 106/18.35
[58] Field of Search ................... 106/18.32–18.35, 106/16; 523/122

[56] References Cited

U.S. PATENT DOCUMENTS

| | | | |
|---|---|---|---|
| 4,104,234 | 8/1978 | Bednarski et al. | 106/18.35 |
| 4,108,990 | 8/1978 | Plum et al. | 106/18.31 |
| 4,139,515 | 2/1979 | Dennington | 260/29.6 MM |
| 4,191,579 | 3/1980 | Hails et al. | 106/18.33 |
| 4,262,097 | 4/1981 | Dawans et al. | 106/16 |

FOREIGN PATENT DOCUMENTS 1457590 4/1974 United Kingdom .

OTHER PUBLICATIONS

G. Ayrey, M. J. Humphrey and R. C. Poller, Preparation, Polymerization and Copolymerization of Some Unsaturated Dibutyltin Carboxylates, European Polymer Journal, vol. 18, pp. 693–697, 1982.

*Primary Examiner*—Lorenzo B. Hayes
*Attorney, Agent, or Firm*—Steele, Gould & Fried

[57] ABSTRACT

A marine anti-fouling paint capable of becoming smoother in use on a ship's hull moving through sea water comprises an effective amount of marine biocide and, as the film-forming binder, a polymer containing diorganotin moieties linked to the polymer by carboxylate linkages. The binder is preferably a copolymer of units of a diorganotin salt of an olefinically unsaturated carboxylic acid of the formula:

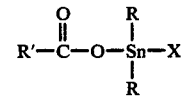

where R' is an olefinically unsaturated group, each group R is a monovalent organic radical linked to the tin atom by a carbon-tin bond and X represents an electronegative group linked to the tin atom by an atom other than carbon, together with units of at least one olefinically unsaturated comonomer.

9 Claims, No Drawings

MARINE ANTI-FOULING PAINT

FIELD OF THE INVENTION

This invention relates to marine anti-fouling paints generally used as a top coat for ships' hulls.

The growth of marine organisms on the submarine parts of a ship's hull increases the frictional resistance of the hull to passage through water, leading to increased fuel consumption and/or a reduction in the speed of the ship. Marine growths such as barnacles and algae accumulate so rapidly that the remedy of cleaning and repainting as required is impractical. In general the extent of fouling by marine organisms is limited by applying to the hull a top coat of a paint which releases a biocide for the marine organism. Traditionally such paints have comprised a relatively inert binder with a biocidal pigment which is leached from the paint but the most successful paints in recent years have been based on a polymeric binder to which the marine biocide is chemically bound and from which the biocide moieties are gradually hydrolysed by sea water.

DESCRIPTION OF THE RELATED ART

For example, British Pat. No. 1,457,590 describes and claims a paint based on a film-forming copolymer containing a triorganotin salt of an olefinically unsaturated carboxylic acid. Upon contact with sea water the copolymer loses triorganotin ions by ion-exchange with sea water. This generates a water-soluble resin which essentially is a copolymer salt formed as a result of the depletion in the copolymer organotin content and exchange with sodium ions present in sea water. This gradual dissolution of the copolymer means that a fresh anti-fouling paint surface is continuously revealed, prolonging the time for which biocide release at the paint surface is maintained above the lethal concentration. The paint of British Pat. No. 1,457,590 has the remarkable property that relatively moving sea water smooths the surface of the paint, removing excrescences composed of paint from the ship. When it is painted on a ship the painted submarine surface of the ship can become smoother during the ordinary traffic of the ship leading to improved efficiency. Such paints known as "self polishing copolymer" paints have gained an increasing reputation over the past few years.

All the commercial self-polishing paints have employed binders which are polycarboxylic acids carrying chemically bound tributyltin oxide. The smoothing of such paints is inevitably accompanied by the release of the biocidal triorganotin ions into the surrounding sea water. In most circumstances this is useful, because the triorganotin ions are effective anti-fouling agents. However, triorganotin ions are expensive to employ and are strongly biocidal and there are some circumstances where the release of triorganotin ions is preferably avoided or reduced whilst still obtaining the benefits of smoothing of the paint in service. The present invention provides a self-smoothing paint which does not release such strongly biocidal ions.

SUMMARY OF THE INVENTION

According to the present invention a marine antifouling paint comprises a film-forming binder and an effective amount of a marine biocide, and is characterised in that it contains, as the film-forming binder, a polymer containing diorganotin moieties linked to the remainder of the polymer by carboxylate linkages.

The paint of the present invention generates a water-soluble residue by hydrolysis of the organotin carboxylate linkages, releasing diorganotin groups into the sea water as diorganotin chloride, hydroxide or oxide. Diorganotin compounds are generally not toxic to animal life and the paint must contain a separate marine biocide. The water-soluble residue contains carboxylate groups satisfied by metal ions from sea water, generally sodium ions. The water-soluble residue is washed away from the surface of the paint film as a ship moves through sea water and the relatively moving sea water smooths the surface of the paint in the same way as with the paint of British Pat. No. 1,457,590. For example, by varying the proportions of diorganotin groups in the binder, paints can be prepared which dissolve smoothly on a surface moving in sea water at rates of dissolution between 0.2 and 5.0 times the rate at which a commercially successful self-polishing paint based on a tributyltin methacrylate copolymer dissolves.

DESCRIPTION OF THE PREFERRED EMBODIMENTS

One form of preferred film-forming binder contains diorganotin carboxylate groups of the formula:

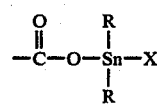

where the groups R, which are the same or different, are monovalent organic radicals linked to the tin atom by a carbon-tin bond and X represents an electronegative group linked to the tin atom by an atom other than carbon. The groups R are preferably alkyl groups having 1 to 12 carbon atoms such as propyl, butyl, hexyl, or octyl, cycloalkyl groups having e.g. 5 to 8 ring carbon atoms such as cyclohexyl, aryl groups having e.g. 6 or 10 ring carbon atoms and optionally one or more allyl substituents of 1 to 6 carbon atoms, such as phenyl or tolyl, or aralkyl groups having e.g. 6 or 10 carbon atoms in the aryl moiety and 1 to 6 carbon atoms in the alkyl moiety such as benzyl. In a particularly preferred class of compounds both the groups R are butyl. The group X can for example be acyloxy, alkoxide, halogen, thiocyanate, nitrile, sulphonyloxy, nitrate, isocyanate, amine or alkylthio; the organic portions of an alkoxide, acyloxy, amine or alkylthio group may for example contain up to 6 carbon atoms and can optionally be substituted, for example by hydroxy, alkoxy, ester or halogen. Examples of acyloxy groups X are acetate, lactate, trimethylacetate, benzoate and hydroxybenzoate. When X is halogen it is preferably chlorine.

The film-forming binder is preferably a polymer in which the diorganotin carboxylate groups are attached to the polymer chain as pendent groups. In one type of preferred binder the polymer comprises units of a dialkyltin salt of an olefinically unsaturated carboxylic acid of the formula

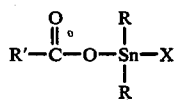

where R' is an olefinically unsaturated group, for example units of a dialkyltin salt of acrylic, methacrylic, maleic, fumaric or itaconic acid, together with units of at least one olefinically unsaturated comonomer. The dialkyltin carboxylate units preferably form at least 10 mole percent of the polymer, more preferably 20 to 50 mole percent. Suitable olefinically unsaturated comonomers include acrylic monomers such as methyl acrylate, ethyl acrylate, propyl acrylate, butyl acrylate, amyl acrylate, hexyl acrylate, methyl methacrylate, and the other corresponding esters of methacrylic acid, acrylonitrile and methacrylonitrile and vinyl monomers such as vinyl acetate, vinyl butyrate, vinyl chloride, vinyl propionate, styrene and vinyl pyridine. The polymer can also contain monomer units conferring increased water reactivity, for example up to 20 mole percent of maleic or itaconic anhydride, acrylamide, methacrylamide or N-vinyl pyrrolidone.

The polymer can contain a minor proportion of links of a triorganotin salt of an unsaturated carboxylic acid, for example tributyltin methacrylate units. For example up to 20 mole percent, preferably 1 to 10 mole percent, of triorganotin carboxylate units can be present in the copolymer binder to give a total proportion of organotin carboxylate units of 20 to 50 mole percent. Such a copolymer binder can be used to form paints which are self-smoothing and which retain some of the enhanced anti-fouling effect given by triorganotin copolymers with a reduced emission of triorganotin and hence a reduced environmental hazard.

Monomers containing the group:

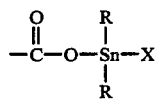

can be prepared by the reaction of a substituted organotin oxide, for example a bis(diorganochloro) tin oxide, with an olefinically unsaturated carboxylic acid

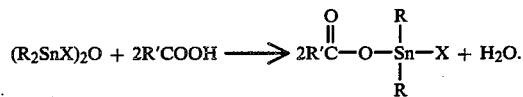

The reaction can be carried out under esterification conditions in an organic solvent, that is by heating, preferably at 50° to 80° C. under reduced pressure, with removal of the water formed in the reaction, preferably by azeotropic distillation. Suitable organic solvents include aromatic hydrocarbons such as toluene or xylene, esters such as butyl acetate or ethoxyethyl acetate, and ketones such as methyl isobutyl ketone or cyclohexanone. Alternatively, the substituted diorganotin oxide can be reacted under esterification conditions with a polymer containing units of an olefinically unsaturated carboxylic acid, although care should be taken to avoid cross-linking, for example by using an excess of the substituted diorganotin oxide.

The substituted diorganotin oxide $(R_2SnX)_2O$ can be prepared by the reaction of a diorganotin oxide $R_2SnO$ with a diorganotin halide, alkoxide, alkylsulphide, carboxylate, thiocyanate, sulphonate or similar compound of the formula $R_2SnX_2$. For example, dibutyltin dichloride, dioctyltin dichloride, dibutyltin diacetate and $(C_4H_9)_2Sn(SCH_2COOC_8H_{17})_2$ are available commercially. The various groups R in the diorganotin oxide and the diorganotin halide or similar compound can be the same or different. The reaction can be carried out under mild conditions, for example at 40° to 80° C. in an organic solvent. Alternatively, the diorganotin oxide $R_2SnO$ can be reacted with an acid of the formula HX with removal of the water formed in the reaction.

In an alternative method of preparing an unsaturated monomer of the formula $R'COOSnR_2X$ a diorganotin oxide can be reacted with an olefinically unsaturated carboxylic acid R'COOH such as acrylic or methacrylic acid under esterification conditions to produce an unsaturated diorganotin carboxylate of the formula $R_2Sn(OOCR')_2$. This can be reacted with a diorganotin compound of the formula $R_2SnX_2$, for example dibutyltin diacetate, di(trimethylacetate), dibenzoate, dilactate or dichloride, or dioctyltin dichloride or diacetate, to produce the monomer of formula $R'COOSnR_2X$.

The film-forming polymers can be prepared by addition polymerisation of the appropriate monomers in the appropriate proportions at polymerisation conditions using a free radical catalyst such as benzoyl peroxide or azobisisobutyronitrile in an organic solvent such as xylene, toluene, butyl acetate, butanol, 2-ethoxy ethanol, cyclohexanone, 2-methoxy ethanol, 2-butoxy ethanol and/or 2-ethoxy ethyl acetate. Polymerisation is preferably carried out at a temperature in the range 70° to 100° C. The presence of the electronegative group in the monomer $R'COOSnR_2X$ may reduce its reactivity ratio in polymerisation compared to other acrylic monomers and care should be taken that this monomer is in fact incorporated in the polymer. The polymerisation can be carried out using a controlled monomer feed, with a higher proportion of the monomer $R'COOSnR_2X$ being present in the earlier stages of polymerisation.

The polymeric binder is mixed with the biocide component of the paint and the pigment of pigments used in the paint. Conventional blending procedures can be used. The marine biocide can be a metalliferous pigment component of the paint or an organic or organometallic marine biocide dispersed in the paint.

The metalliferous pigment is preferably sparingly soluble in sea water or is a substantially water-insoluble metalliferous pigment capable of reacting with sea water. It is exemplified by cuprous thiocyanate, cuprous oxide, zinc oxide, zinc chromate, cupric acetate meta-arsenate, and zinc ethylene bis(dithiocarbamate). These pigments produce water-soluble metal compounds on reaction with sea water so that the pigment particles do not survive at the paint surface. Preferably, the sparingly soluble pigment has a solubility in sea water of from 1 to 10 parts per million by weight. The pigment has the effect of inducing the overall smoothing which the relatively moving sea water exerts on the paint film, minimising localised erosion and preferentially removing excrescences formed during application of the paint. Mixtures of such pigments can be used, for example zinc oxide, which is most effective at inducing the gradual dissolution of the paint, can be mixed with cuprous oxide, cuprous thiocyanate or zinc ethylene bis(dithiocarbamate), which are most effective marine biocides. The ratio of zinc oxide to cuprous oxide or thiocyanate can for example be 1:1 to 9:1 by weight.

The paint composition can additionally contain a pigment which is highly insoluble in sea water (solubility below 1 ppm by weight), such as titanium dioxide or ferric oxide. Such highly insoluble pigments can be used in proportions up to 40 percent by weight of the total pigment component of the paint, but preferably are used in proportions of less than 20 percent by weight. The highly insoluble pigment has the effect of retarding the dissolution of the paint. Alternatively, the paint may contain a hydrophobic organic retarder as described in British Pat. No. 1,457,590, for example a chlorinated paraffin.

The proportion of pigment to copolymer is preferably such as to give a pigment volume concentration which is above 25 percent in the dry paint film but below the critical pigment volume concentration; most preferably the pigment volume concentration is 35 to 50 percent. The biocidal effect of the sparingly sea-water-soluble pigments, particularly zinc ethylene bis(dithiocarbamate) and cuprous oxide, mauy be sufficient so that the paint needs no further biocide, for example in the case of paint for use on the flat bottom of a very large tanker, where fouling is less likely to occur. We believe that the self-smoothing action of the paint increases its resistance to fouling compared to conventional paint releasing biocides at the same rate. This effect is more marked with increasing rate of dissolution of the paint.

The paint can contain an added biocide or biocides effective against algae, seaweed, barnacles and diatoms. Triorganotin salts and oxides such as triphenyltin fluoride, tributyltin fluoride, tributyltin dibromosuccinate, triphenyltin chloride, triphenyltin hydroxide and tributyltin oxide are effective marine biocides and can be used in paints according to the invention. A paint according to the invention comprising a triorganotin salt (up to 25 percent by volume of the pigments) may have anti-fouling and smoothing properties equal to a triorganotin copolymer paint of much higher total triorganotin content. In some cases it will be desired to avoid completely the release of triorganotin ions. Examples of other biocides effective as marine anti-fouling agents are dithiocarbamate derivatives such as cuprous ethylene bis(dithiocarbamate) or tetramethyl thiuram disulphide and dichlorodiphenyltrichloroethane.

The paint can contain a small proportion, for example 1 to 5 percent by weight based on the copolymer, of a free monocarboxylic acid, for example acetic, trimethylacetic, or lactic acid. We have found that the use of such an acid improves the compatibility of the polymeric binder with aromatic hydrocarbon solvents such as xylene.

The invention is illustrated by the following Examples:

EXAMPLE 1

Monomer preparation

Dibutyltin oxide (49.8 g) was added to xylene (250 g) containing acrylic acid (28.8 g). Hydroquinone (0.01 g) was then added as a polymerisation inhibitor. The mixture was then heated under reduced pressure with the water produced being collected in a Dean and Stark receiver.

After all the water had been collected (3.6 g), the heating was stopped and the solution allowed to cool.

Dibutyltin dichloride (60.77 g) was added to the solution produced above. The resulting mixture was then stirred for 2 hours at 70° C. The resulting product, dibutyl chlorotin acrylate, was crystallised out of the xylene by solvent evaporation and subsequent cooling to −20° C.

The crude product was recrystallised from petroleum spirits 3 times to yield 129 g (95 percent) white solid, melting point 84° C.–85° C. A nuclear magnetic resonance ('H) spectrum of the product showed butyl:acrylate groups in the ratio of 2:1.

Polymer preparation

Dibutyl chlorotin acrylate (49.8 g) was added to methylmethacrylate (22 g), butyl acrylate (46.9 g), xylene (280 g) and azobisisobutyronitrile (AIBN) (1.2 g).

The mixture was then heated to 70° C. under nitrogen with stirring for 4 hours, producing a clear viscous solution which was used as the binder in the manufacture of a paint.

Paint formulation

| | percent by weight |
|---|---|
| Polymer Solution | 73.74 |
| Blue Pigment | 0.27 |
| Titanium Dioxide | 1.46 |
| Micronised Talc | 3.38 |
| Structuring agent | 1.12 |
| (Colloidal silica & bentonite) | |
| Cuprous thiocyanate | 11.94 |
| Xylene | 7.76 |
| n-Butyl alcohol | 0.33 |

The above ingredients were ground in a minimill to produce a film-forming paint of P.V.C 31.6 percent (P.V.C=Pigment Volume Concentration) and solids content 22 percent by volume.

EXAMPLE 2

Dibutyltin oxide (249 g) was added to xylene (500 g) containing dibutyltin diacetate (351.1 g). The mixture was then stirred for 3 hours at 75° C.

The solvent was then removed in a rotary evaporator to yield 595 g of a white crystalline solid. The white solid was recrystallised twice from diethyl ether to yield 570 g (95%) white solid, mpt 58°–60° C. Infra red and 'H nmr spectra showed the product to be dibutylacetato tin oxide.

Dibutylacetato tin oxide (600.1 g) was added to xylene (726 g) containing acrylic acid (144.1 g) and hydroquinone (0.02 g). The resulting solution was heated under reduced pressure, with the water produced (18 g) being collected in a Dean and Stark receiver.

'H nmr analysis of the resultant solution showed butyl:acrylate:acetate groups in the ratio 2:1:1.

Polymer preparation

Dibutylacetato tin acrylate solution as prepared above (130.0 g) was added to ethyl acrylate (53.7 g), xylene (215 g) and AIBN (1.2 g).

The mixture was then heated to 75° C. under nitrogen with stirring for 3 hours, producing a clear viscous solution which was then used as the binder in the manufacture of a paint.

Paint formulation

| | percent by weight |
|---|---|
| Polymer solution as prepared above | 59.94 |
| Blue Pigment | 0.24 |
| Titanium Dioxide | 1.29 |
| Micronised Talc | 2.97 |
| Structuring Agent | 0.99 |
| (Colloidal Silica and Bentonite) | |

-continued

| | percent by weight |
|---|---|
| Cuprous thiocyanate | 10.49 |
| Xylene | 23.95 |
| n-Butyl alcohol | 0.13 |

The above ingredients were ground in a minimill to produce a film-forming paint of P.V.C=31.6 percent and solids content 19.6 percent by volume.

The rate of dissolution of the paint on movement through sea water was tested using a rotating disc apparatus of the type described in U.S. Pat. No. 4,191,579 with reference to FIGS. 5 and 6. Stripes of the paint of Example 2 appeared to dissolve smoothly in sea water; they disappeared 2.1 times as fast as stripes of a commercially successful triorganotin copolymer paint.

EXAMPLES 3 TO 9

Dibutylacetato tin acrylate as prepared in Example 2 was copolymerised with acrylic esters in various proportions using the procedure of Example 2 as set out in the following Table 1:

TABLE 1

Preparation of Polymer Solutions

Weight in grams

| Example No. | Dibutyl-acetato-tin acrylate solution | Ethyl acrylate | Butyl acrylate | Methyl methacrylate | Xylene | AIBN |
|---|---|---|---|---|---|---|
| 3 | 113.0 | 62.3 | — | — | 224 | 1.2 |
| 4 | 144.6 | 46.5 | — | — | 208 | 1.2 |
| 5 | 111.0 | 53.5 | 9.8 | — | 225 | 1.2 |
| 6 | 142.3 | 39.2 | 8.4 | — | 209 | 1.2 |
| 7 | 138.1 | 25.4 | 24.3 | — | 211 | 1.2 |
| 8 | 113.0 | 54.5 | — | 7.8 | 224 | 1.2 |
| 9 | 113.0 | 38.9 | — | 23.4 | 224 | 1.2 |

The resulting polymer solutions were made into paints having the following formulations:

TABLE 2

Paint Formulation

% by weight except for PVC and solids content

| Example No. | 3 | 4 | 5 | 6 | 7 | 8 | 9 |
|---|---|---|---|---|---|---|---|
| Polymer Solution | 62.57 | 66.98 | 61.27 | 67.57 | 68.20 | 64.02 | 58.44 |
| Blue Pigment | 0.26 | 0.26 | 0.25 | 0.27 | 0.27 | 0.26 | 0.25 |
| Titanium dioxide | 1.41 | 1.40 | 1.37 | 1.47 | 1.45 | 1.40 | 1.33 |
| Talc | 3.25 | 3.22 | 3.18 | 3.40 | 3.33 | 3.22 | 3.05 |
| Structuring agents | 1.08 | 1.07 | 1.05 | 1.13 | 1.11 | 1.07 | 1.01 |
| Cuprous thiocyanate | 11.50 | 11.39 | 11.25 | 12.00 | 11.77 | 11.39 | 10.81 |
| Xylene | 19.70 | 15.62 | 21.31 | 13.71 | 13.43 | 18.22 | 24.71 |
| n-butanol | 0.23 | 0.06 | 0.32 | 0.45 | 0.45 | 0.42 | 0.40 |
| P.V.C of paint | 31.6 | 31.6 | 31.6 | 31.6 | 31.6 | 31.6 | 31.6 |
| Solids content (percent by volume) | 20.7 | 20.7 | 20.1 | 22.0 | 21.5 | 20.6 | 19.3 |

The rate of dissolution of the paints on movement through sea water was tested using a rotating disc apparatus. All the paints appeared to dissolve smoothly in sea water. The rate of disappearance compared to the commercially successful triorganotin copolymer paint mentioned in Example 2 was:

| Example No. | Relative Rate |
|---|---|
| 3 | 1.6 |
| 4 | 2.4 |
| 5 | 0.25 |
| 6 | 4.7 |
| 7 | 0.8 |
| 8 | 3.3 |
| 9 | 1.9 |

The more rapidly dissolving paints such as those of Examples 4, 6 and 8 could be made to dissolve more slowly, for example by the addition of a hydrophobic organic retarder as described in British Pat. No. 1457590.

EXAMPLE 10

Dioctylchlorotin acrylate was prepared using the procedure of Example 1 with 72.2 g dioctyltin oxide in place of dibutyltin oxide and 83.2 g dioctyltin chloride in place of dibutyltin chloride. 173.4 g dioctylchlorotin acrylate (melting point 74°–75° C.) was obtained.

Polymer preparation

Dioctylchlorotin acrylate as prepared above (75.2 g) was added to methyl methacrylate (22.2 g), butyl acrylate (21.4 g), xylene (280 g) and AIBN (1.2 g). The mixture was heated to 70° C. under nitrogen with stirring for 4 hours producing a clear viscous solution which was used as the binder in the manufacture of a paint.

Paint formulation

| | percent by weight |
|---|---|
| Polymer Solution | 75.05 |
| Blue Pigment | 0.36 |
| Titanium Dioxide | 1.93 |
| Micronised Talc | 4.46 |
| Structuring Agent | 1.49 |
| Cuprous Thiocyanate | 15.76 |
| n-butanol | 0.95 |

The above ingredients were ground in a minimill to produce a film-forming paint of P.V.C=33.4 percent and solids content 28.7 percent by volume.

EXAMPLES 11 AND 12

Dioctyl tin oxide (361 g) was added to xylene (750 g) containing dioctyl tin diacetate (463.1 g). The mixture was then stirred for 3 hours at 75° C.

The solvent was then removed in a rotary evaporator to yield 810 g (98 percent) of a viscous white liquid. Infra red and 'H nmr spectra showed the product to be dioctylacetato tin oxide.

Dioctylacetato tin oxide (800 g) was added to xylene (615 g) containing acrylic acid (139.9 g) and hydroquinone (0.02 g). The resulting solution was heated under reduced pressure, with the water produced (17.5 g) being collected in a Dean and Stark receiver.

'H nmr analysis of the resultant solution showed octyl:acrylate:acetate groups in the ratio 2:1:1 consistent with the structure dioctylacetato tin acrylate.

Dioctylacetato tin acrylate solution as prepared above was added to ethyl acrylate, butyl acrylate and xylene in the proportions set out in Table 3 and polymerised using the procedure of Example 2.

TABLE 3

Preparation of Polymer Solutions

| | Weight in grams | |
|---|---|---|
| | Example 11 | Example 12 |
| Dioctylacetato tin acrylate solution | 124.9 | 153.2 |
| Ethyl acrylate | 39.4 | 21.5 |
| Butyl acrylate | 16.8 | 20.6 |
| Xylene | 218 | 203 |
| AIBN | 1.2 | 1.2 |

The resulting polymer solutions were made into paints having the formulations of Table 4:

TABLE 4

Paint Formulations

| | percent by weight | |
|---|---|---|
| | Example 11 | Example 12 |
| Polymer solution | 75.06 | 74.25 |
| Blue pigment | 0.36 | 0.37 |
| Titanium dioxide | 1.93 | 1.99 |
| Talc | 4.45 | 4.58 |
| Structuring agents | 1.49 | 1.52 |
| Cuprous thiocyanate | 15.75 | 16.20 |
| n-butanol | 0.94 | 1.06 |
| P.V.C of paint (%) | 31.6 | 31.6 |
| Solids content (% volume) | 30.2 | 31.3 |

EXAMPLE 13

Dibutyl tin oxide (114.4 g) was added to xylene (300 g) containing dibutyl tin ditrimethylacetate (200 g). The mixture was then stirred for 3 hours at 75° C.

The solvent was removed in a rotary evaporator to yield 311 g of a white crystalline solid. The white solid was recrystallised twice from petroleum ether to yield 298 g (95%) of a white solid. Infra red and 'H nmr spectra confirmed the identity of the product as dibutyl trimethylacetato tin oxide.

Dibutyl trimethylacetato tin oxide (200 g) was added to xylene (237 g) containing acrylic acid (42.17 g) and hydroquinone (0.02 g). The resulting solution was heated under reduced pressure, with the water produced (5.3 g) being collected in a Dean and Stark receiver.

After all the water had been collected the solution was cooled. 'H nmr analysis of the resultant solution showed butyl:acrylate:trimethylacetate groups in the ratio 2:1:1 consistent with the structure dibutyl trimethylacetato tin acrylate.

Polymer preparation

Dibutyl trimethylacetato tin acrylate solution as prepared above (166.46 g) was added to butyl acrylate (38.2 g), xylene (194 g) and AIBN (1.2 g).

The mixture was then heated to 75° C. under nitrogen with stirring for 3 hours, producing a clear viscous solution which was then used as the binder in the manufacture of a paint.

Paint formulation

| | percent by weight |
|---|---|
| Polymer solution as prepared above | 80.01 |
| Blue pigment | 0.29 |
| Titanium dioxide | 1.58 |
| Micronised Talc | 3.65 |
| Structuring agent | 1.21 |
| Cuprous thiocyanate | 12.89 |

-continued

| | percent by weight |
|---|---|
| n-butanol | 0.37 |

The above ingredients were ground in a minimill to produce a film-forming paint of P.V.C=31.6 percent and solids content 24.1 percent by volume.

EXAMPLE 14

Monomer preparation

Dibutyl tin oxide (373.5 g) was added to xylene (400 g) containing ortho-hydroxybenzoic acid (207.18 g). The mixture was heated to reflux, with the water produced (27 g) being collected in a Dean and Stark receiver. The solvent was then removed in a rotary evaporator to yield 548 g of a white solid. The white solid was recrystallised twice from petroleum spirit to yield 540 g (97%) of product, melting point 231°–232° C.

'H nmr and infra red spectra of the product confirmed its identity to be (O-Oxybenzolyloxy)dibutyl tin which is formed according to the equation below:

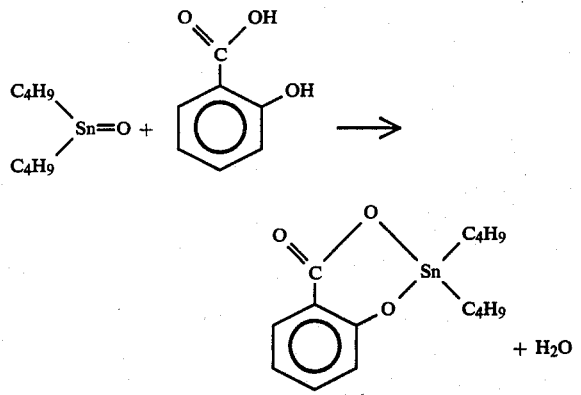

(O-Oxybenzoyloxy)dibutyl tin (400 g) was added to xylene (478 g) containing acid (78.1 g) and hydroquinone (0.1 g). The resultant mixture was heated for 2 hours at 60° C. with stirring to produce a solution of dibutyl hydroxy benzoato tin acrylate.

Polymer preparation

Dibutyl hydroxy benzoato tin acrylate solution as prepared above (124.6 g) was added to ethyl acrylate (56.47 g), xylene (217 g) and AIBN (1.2 g).

The mixture was heated to 75° C. under nitrogen with stirring for 3 hours producing a clear viscous solution.

The polymer solution thus produced was made into a paint using the formulation of Example 13.

What is claimed is:

1. A marine antifouling paint comprising a film-forming binder and an effective amount of a marine biocide, the film-forming binder being a copolymer of units of a dialkyltin salt of an olefinically unsaturated carboxylic acid of the formula:

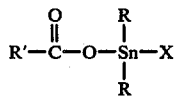

where the groups R, which are the same or different, are monovalent organic radicals linked to the tin atom by a carbon-tin bond, X represents an electroengative group linked to the tin atom by an atom other than carbon and R' is an olefinically unsaturated group, and units of at least one olefinically unsaturated comonomer, the dialkyltin salt units being present in the binder polymer as pendent diorganotin carboxylate groups of the formula:

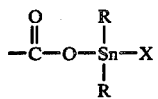

and forming at least 10 mole percent of the polymer.

2. A paint according to claim 1 wherein each group R is an alkyl group having 1 to 12 carbon atoms.

3. A paint according to claim 2, wherein the groups R are both butyl groups.

4. A paint according to claim 1 wherein the group X is an acyloxy group.

5. A paint according to claim 1 wherein the group X is an alkoxide, halogen, thiocyanate, nitrile, sulphonyloxy, nitrate, isocyanate, amine or alkylthio group.

6. A paint according to claim 1 wherein the dialkyltin carboxylate units form 20 to 50 mole percent of the copolymer.

7. A paint according to claim 1 wherein the film-forming binder polymer does not contain triorganotin moieties.

8. A paint according to claim 1 wherein the marine biocide is a metalliferous pigment compound of the paint.

9. A paint according to claim 1 wherein the paint contains 1 to 5 percent by weight of a monocarboxylic acid.

* * * * *